United States Patent
Arimura (10) Patent No.: US 8,757,616 B2
(45) Date of Patent: Jun. 24, 2014

(54) SHEET FEEDING MECHANISM AND IMAGE FORMING APPARATUS PROVIDED WITH THE SAME

(75) Inventor: Shingo Arimura, Osaka (JP)

(73) Assignee: Kyocera Document Solutions Inc. (JP)

( * ) Notice: Subject to any disclaimer, the term of this patent is extended or adjusted under 35 U.S.C. 154(b) by 166 days.

(21) Appl. No.: 13/462,865

(22) Filed: May 3, 2012

(65) Prior Publication Data

US 2012/0287454 A1 Nov. 15, 2012

(30) Foreign Application Priority Data

May 12, 2011 (JP) ................................. 2011-107245

(51) Int. Cl.
| | |
|---|---|
| *B65H 7/02* | (2006.01) |
| *B65H 3/06* | (2006.01) |
| *B65H 3/52* | (2006.01) |
| *B65H 7/14* | (2006.01) |

(52) U.S. Cl.
CPC .............. *B65H 3/5223* (2013.01); *B65H 7/14* (2013.01); *B65H 3/0684* (2013.01)
USPC ....................... 271/258.01; 271/117; 271/121

(58) Field of Classification Search
CPC ...... B65H 3/0684; B65H 3/5223; B65H 3/52; B65H 7/14
USPC .............. 271/117, 121, 10.02, 137, 138, 259, 271/167, 258.01, 263
See application file for complete search history.

(56) References Cited

U.S. PATENT DOCUMENTS

| | | | | |
|---|---|---|---|---|
| 5,026,043 A | * | 6/1991 | Tanjo et al. | 271/121 |
| 5,676,365 A | * | 10/1997 | Pittelkow et al. | 271/125 |
| 5,927,703 A | * | 7/1999 | Endo | 271/10.03 |
| 6,338,480 B1 | * | 1/2002 | Endo | 271/104 |
| 6,508,465 B1 | * | 1/2003 | Endo | 271/265.01 |
| 6,543,761 B2 | * | 4/2003 | Endo | 271/110 |
| 7,441,766 B2 | * | 10/2008 | Seki et al. | 271/121 |
| 2004/0065993 A1 | * | 4/2004 | Kamijoh | 271/121 |

FOREIGN PATENT DOCUMENTS

| | | |
|---|---|---|
| JP | 2007-22762 | 2/2007 |
| JP | 2007022762 A * | 2/2007 |
| JP | 2010064879 A * | 3/2010 |

* cited by examiner

*Primary Examiner* — Patrick Cicchino
(74) *Attorney, Agent, or Firm* — Gerald E. Hespos; Michael J. Porco; Matthew T. Hespos (57) ABSTRACT

A sheet feeding mechanism includes a separating member, a biasing member, a detectable portion and a detector. The separating member is mounted on a base portion to be movable between a first position to which the separating member is positioned when being pressed by a sheet feeding member and a second position at a distance from the first position. The biasing member biases the separating member so that the separating member moves from the first position toward the second position. The detectable portion is provided on the separating member. The detector detects the detectable portion at a detection position. The detectable portion is present at the detection position when the separating member is located at the first position and deviates from the detection position when the separating member is moved to the second position.

4 Claims, 12 Drawing Sheets

SHEET FEEDING MECHANISM AND IMAGE FORMING APPARATUS PROVIDED WITH THE SAME

This application is based on and claims the benefit of priority from Japanese Patent Application Serial No. 2011-107245 filed with the Japan Patent Office on May 12, 2011, the contents of which are hereby incorporated by reference.

BACKGROUND

The present disclosure relates to a sheet feeding mechanism for feeding a sheet and an image forming apparatus provided with the same.

An image forming apparatus represented by a copier, a printer, a facsimile machine or a complex machine provided with these functions generally includes a sheet feeding mechanism for picking up sheets one by one from a sheet stack composed of a plurality of sheets stacked one over another and conveying them to an image forming unit. The sheet feeding mechanism includes a feed roller which rotates while being held in contact with the upper surface of the sheet stack to feed a sheet, and a separating member such as a separation pad which is arranged to face the feed roller. The separation pad has a function of applying a frictional force to the sheets other than the uppermost one and suppressing the feed of unnecessary sheets when the feed roller is about to feed a plurality of sheets from the sheet stack. These feed roller and separation pad tend to be worn down due to contact with the sheets and need a higher frequency of maintenance than other parts.

In recent years, there is an increasing tendency for user-maintainable image forming apparatuses. On the other hand, after maintenance operation, a user may forget to mount a feed roller or a separation pad. If the image forming apparatus is started in such a state, problems such as no feed of sheets and the simultaneous feed of a plurality of sheets occur.

Accordingly, an image forming apparatus provided with a sensor capable of detecting the presence or absence of a feed roller has been proposed as a conventional technology. In this image forming apparatus, unless the feed roller is mounted at a predetermined position, a separation pad which is pressed against the feed roller during a normal operation moves upward and a projecting plate projecting laterally to the separation pad rotates a roller detection arm at that time. By separating a switch flag of a photosensor from the photosensor utilizing a rotational force of this roller detection arm, the presence or absence of the feed roller is detected.

However, the structure of the image forming apparatus as described above has a problem that one photosensor can detect only the presence or absence of the feed roller and cannot detect the presence or absence of the separation pad. That is, if the separation pad is not mounted, a switching operation of separating the switch flag from the photosensor utilizing a movement of the separation pad cannot be performed. Thus, the absence of the separation pad cannot be detected. Further, since the switching operation of the photosensor cannot be performed similarly also when both the feed roller and the separation pad are absent, the absence of both the feed roller and the separation pad cannot also be detected.

Thus, the above structure further requires a sensor exclusively used for the separation pad to detect the presence or absence of the separation pad. However, if the sensors for individually detecting the presence or absence of the feed roller and the separation pad are respectively provided, production cost increases and a large space is necessary to install a plurality of sensors.

The present disclosure was developed to solve the above problem and an object thereof is to provide a sheet feeding mechanism capable of detecting the presence or absence of a feed roller and a separation pad by one detector and an image forming apparatus provided with the same.

SUMMARY

A sheet feeding mechanism of the present disclosure comprises a base portion, a sheet feeding member, a separating member, a biasing member, a detectable portion and a detector. The sheet feeding member is rotatably supported on the base portion and conveys a sheet. The separating member is a member for separating a sheet being conveyed by the sheet feeding member from a sheet stack. The separating member is mounted on the base portion to be movable between a first position to which the separating member is positioned when being pressed by the sheet feeding member and a second position at a distance from the first position. The biasing member biases the separating member so that the separating member moves from the first position toward the second position. The detectable portion is provided on the separating member. The detector detects the detectable portion at a detection position. The detectable portion is present at the detection position when the separating member is positioned at the first position and deviates from the detection position when the separating member is moved to the second position.

Further, an image forming apparatus according to another aspect of the present disclosure comprises the above sheet feeding mechanism and an image forming unit. The image forming unit forms an image on the sheet conveyed by the sheet feeding mechanism.

Furthermore, an image reading apparatus according to still another aspect of the present disclosure comprises the above sheet feeding mechanism and an image reading unit. The image reading unit reads an image formed on the sheet conveyed by the sheet feeding mechanism.

These and other objects, features and advantages of the present disclosure will become more apparent upon reading the following detailed description along with the accompanying drawings.

DETAILED DESCRIPTION

Hereinafter, one embodiment of the present disclosure is described in detail with reference to the drawings. Note that direction-indicating terms such as "upper", "lower", "left", "right" and "front" used in the following description are merely for the purpose of clarifying the description and do not limit the present disclosure at all. In the following description, a term "sheet" means a sheet material to which an image forming process is to be applied such as a copy sheet, a coated paper, an OHP sheet, a cardboard, a postcard or a tracing paper or another sheet material on which an arbitrary process other than the image forming process is to be applied. Although a "sheet feeding mechanism" disclosed below is used to convey a "sheet" to which the image forming process is to be applied, it may be used to convey a sheet to which an arbitrary process (e.g. a perforation process, a bending process or a cutting process) other than the image forming process is to be applied in another specific embodiment. Terms "upstream" and "downstream" and those similar to these used in the following description mean "upstream" and "downstream" in a sheet conveying direction and a concept similar to these.

Figure 1:
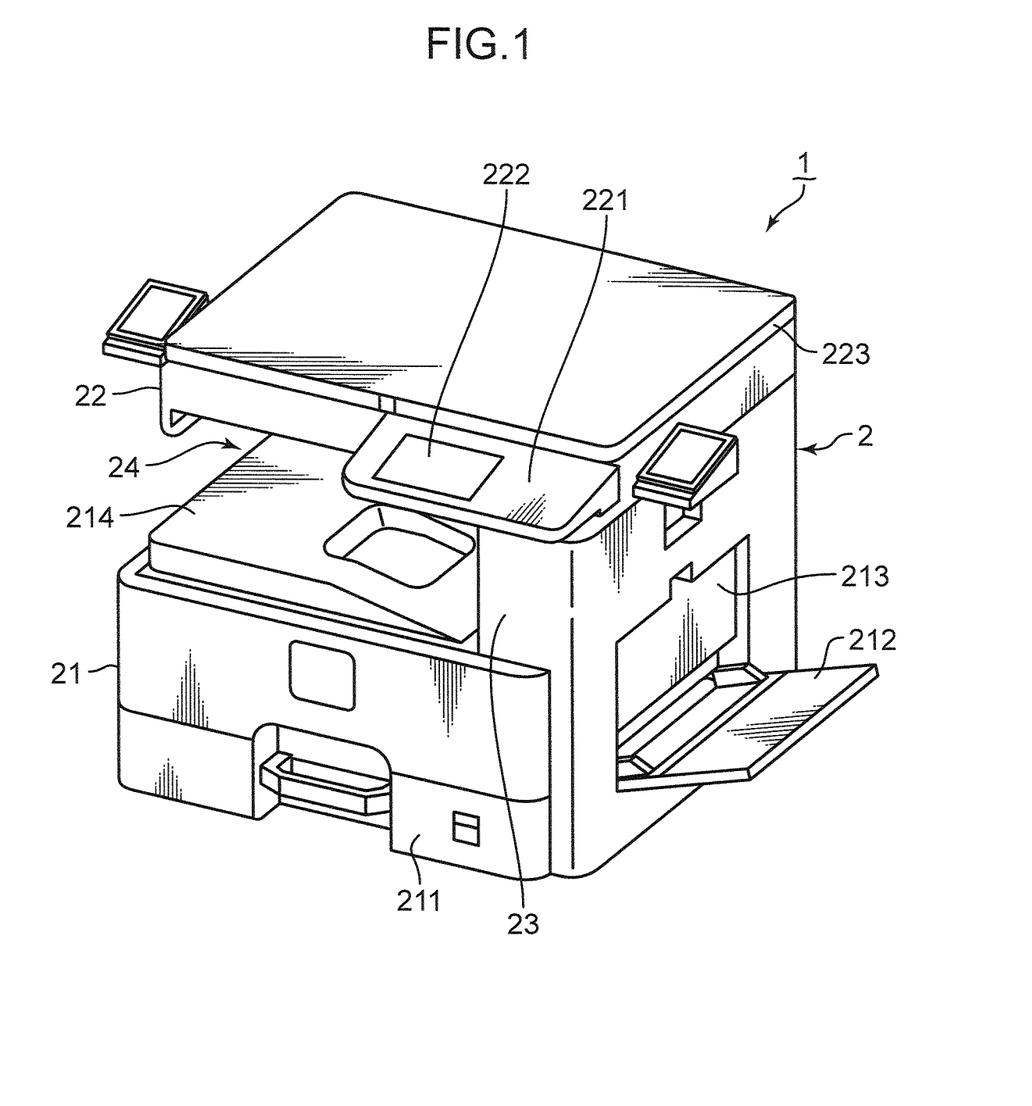
FIG. 1 is a perspective view of an image forming apparatus according to an embodiment of the present disclosure.
Figure 2:
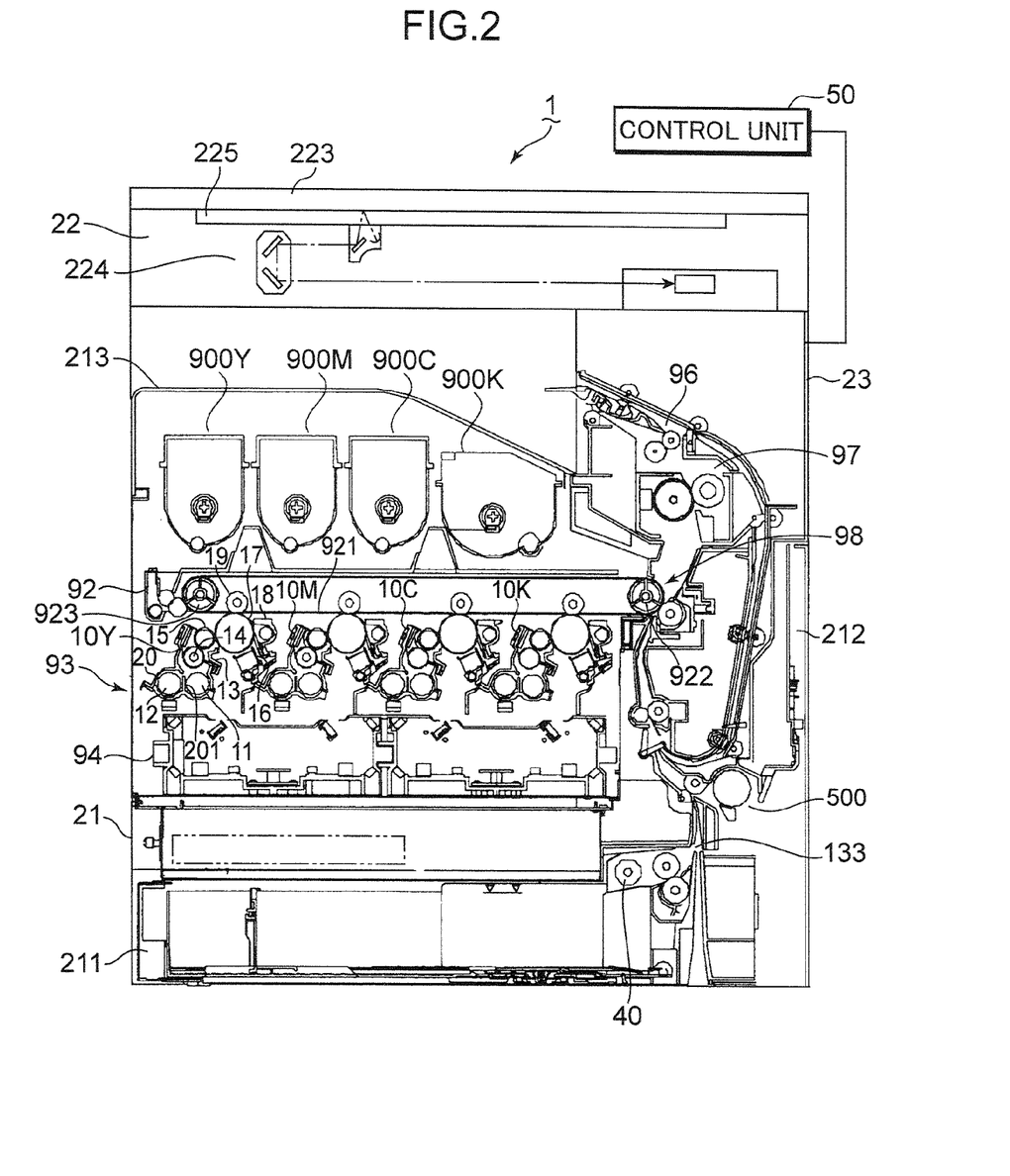
FIG. 2 is a diagram showing the internal configuration of the image forming apparatus shown in FIG. 1.

FIG. 1 is a perspective view of an image forming apparatus 1 with a built-in sheet feeding mechanism 500. FIG. 2 schematically shows the internal configuration of the image forming apparatus shown in FIG. 1. Although the image forming apparatus shown in FIGS. 1 and 2 is a copier of a so-called internal discharge type, the present disclosure is not limited to this and the image forming apparatus may be a printer, a facsimile machine, a complex machine provided with these functions or another apparatus for forming a toner image on a sheet.

The image forming apparatus 1 includes a substantially rectangular parallelepiped housing 2. The housing 2 includes a substantially rectangular parallelepiped lower housing 21, a substantially rectangular parallelepiped upper housing 22 arranged above the lower housing 21, and a coupling housing 23 coupling the lower housing 21 and the upper housing 22. The coupling housing 23 extends along the right side and the rear side of the housing 2. A sheet having a printing process applied thereto is discharged to a discharge space 24 defined by the lower housing 21, the upper housing 22 and the coupling housing 23.

An operation unit 221 projecting forward from the upper housing 22 includes, for example, an LCD touch panel 222. The operation unit 221 is so formed that information on an image forming process can be input. A user can input, for example, the number of sheets to be printed, print density and the like through the LCD touch panel 222. A device for reading an image of a document and an electronic circuit for administrating an overall control of the image forming apparatus 1 are mainly housed in the upper housing 22.

A pressing cover 223 arranged above the upper housing 22 is used to press a document. The pressing cover 223 is mounted on the upper housing 22 rotatably upward and downward. The user rotates the pressing cover 223 upward and places a document on the upper housing 22. Thereafter, the user operates the operation unit 221, and thereby, an image of the document can be read by the document reading device arranged in the upper housing 22.

A cassette 211 formed to be able to store sheets is housed in the lower housing 21. The cassette 211 can be pulled out forward from the lower housing 21. The sheets stored in the cassette 211 have an image forming process applied thereto in the lower housing 21 and discharged to the discharge space 24 based on an instruction input by the user through the operation unit 221.

A tray 212 is rotatably attached to the right surface of the lower housing 21. The user can place a sheet on the tray 212 when the tray 212 is at a position to project to the right of the lower housing 21 as shown in FIG. 1. Based on an instruction input by the user through the operation unit 221, the sheet on the tray 212 is pulled into the lower housing 21, and thereafter, the sheet has an image forming process applied thereto and is discharged to the discharge space 24. When being rotated upward, the tray 212 is housed in a housing space 213 formed by recessing the right surface of the lower housing 21 to close a feed opening for pulling a sheet into the lower housing 21.

The lower housing 21 houses various devices for forming an image on a sheet. Further, the coupling housing 23 houses various devices for discharging a sheet having an image forming process applied thereto to the discharge space 24.

FIG. 2 schematically shows the internal configuration of the image forming apparatus 1 shown in FIG. 1. The image forming apparatus 1 is further described with reference to FIG. 1 as well as FIG. 2.

The upper housing 22 houses a scanning mechanism 224. The user can cause the image forming apparatus 1 to read an image of a desired document through the scanning mechanism 224. A contact glass 225 mounted in the upper surface of the upper housing 22 is arranged above the scanning mechanism 224. The pressing cover 223 is used to press a document placed on the contact glass 225. When the user operates the image forming apparatus 1 through the operation unit 221, the scanning mechanism 224 scans and reads an image of a document on the contact glass 225. Analog information of the image read by the scanning mechanism 224 is converted into a digital signal. The image forming apparatus 1 forms an image on a sheet based on the digital signal.

The lower housing 21 includes toner containers 900Y, 900M, 900C and 900K, an intermediate transfer unit 92, an image forming unit 93, an exposure unit 94, a fixing unit 97, a discharge unit 96 and the sheet feeding mechanism 500.

The image forming unit 93 includes the yellow toner container 900Y, the magenta toner container 900M, the cyan toner container 900C and the black toner container 900K. Developing devices 10Y, 10M, 10C and 10K corresponding to respective YMCK colors are arranged below these containers.

The image forming unit 93 includes photoconductive drums (photoconductors on which latent images are to be electrophotographically formed) for bearing toner images of the respective colors. Photoconductive drums using an amorphous silicon (a-Si) material may be used as the photoconductive drums 17. Yellow, magenta, cyan and black toners are respectively supplied to the respective photoconductive drums 17 from the toner containers 900Y, 900M, 900C and 900K.

A charger 16, a developing device 10 (10Y, 10M, 10C, 10K), a transfer device (transfer roller) 19 and a cleaner 18 are arranged around each photoconductive drum 17. The charger 16 uniformly charges the surface of the photoconductive drum 17. The surface of the charged photoconductive drum 17 is exposed to light by the exposure unit 94, whereby an electrostatic latent image is formed. The exposure unit 94 irradiates a laser beam based on a digital signal generated by the above scanning mechanism 224. The developing devices 10Y, 10M, 10C and 10K respectively develop (visualize) electrostatic latent images formed on the respective photoconductive drums 17 by using the toners of the respective colors supplied from the toner containers 900Y, 900M, 900C and 900K. The transfer roller 19 and the photoconductive drum 17 sandwiches an intermediate transfer belt 921 between them to form a nip portion, and a toner image on the photoconductive drum 17 is primarily transferred to the intermediate transfer belt 921. The cleaner 18 cleans the circumferential surface of the photoconductive drum 17 after the transfer of a toner image.

The exposure unit 94 includes a light source and various optical devices such as a polygon mirror, a reflecting mirror and a deflecting mirror, and irradiates the circumferential surfaces of the photoconductive drums 17 provided in the image forming unit 93 with beams based on image data to form electrostatic latent images.

The intermediate transfer unit 92 includes the intermediate transfer belt 921, a drive roller 922 and a driven roller 923. Toner images from a plurality of photoconductive drums 17 are superimposed on the intermediate transfer belt 921 (primary transfer). The superimposed transferred toner images are secondarily transferred to a sheet supplied from the cassette 211 or the tray 212 (see FIG. 1) in a secondary transfer unit 98. The drive roller 922 and the driven roller 923 for driving and rotating the intermediate transfer belt 921 are rotatably supported on the lower housing 21.

The fixing unit 97 applies a fixing process to a toner image on a sheet secondarily transferred from the intermediate transfer unit 92. The sheet with the fixed color image is discharged toward the discharge unit 96 formed above the fixing unit 97 (in the coupling housing 23).

The discharge unit 96 discharges a sheet conveyed from the fixing unit 97 onto an upper surface 214 of the lower housing 21 used as a discharge tray.

The cassette 211 stores a sheet stack composed of a plurality of sheets which are stacked one over another and on which an image is to be formed. As described above, the cassette 211 is removably mounted into the lower housing 21. By driving a pickup roller 40 provided in the cassette 211, the uppermost sheet of the sheet stack in the cassette 211 is picked up one by one, fed into a sheet conveyance path 133 and introduced into the image forming unit 93.

The tray 212 is arranged above the cassette 211. The tray 212 shown in FIG. 2 is at a closed position to close the feed opening. The tray 212 is rotated rightward about a lower end portion thereof acting as an axis of rotation, so that a sheet stack composed of a plurality of sheets stacked one over another can be supported thereon. The sheet feeding mechanism 500 is arranged near the lower end portion of the tray 212. The sheet feeding mechanism 500 functions as a sheet feeder for feeding sheets placed on the tray 212 one by one to the image forming unit 93. The image forming unit 93 forms an image on a sheet fed into the lower housing 21 by the sheet feeding mechanism 500. The sheet feeding mechanism 500 is described in detail below.

(Description of the Sheet Feeding Mechanism 500)

Figure 3:
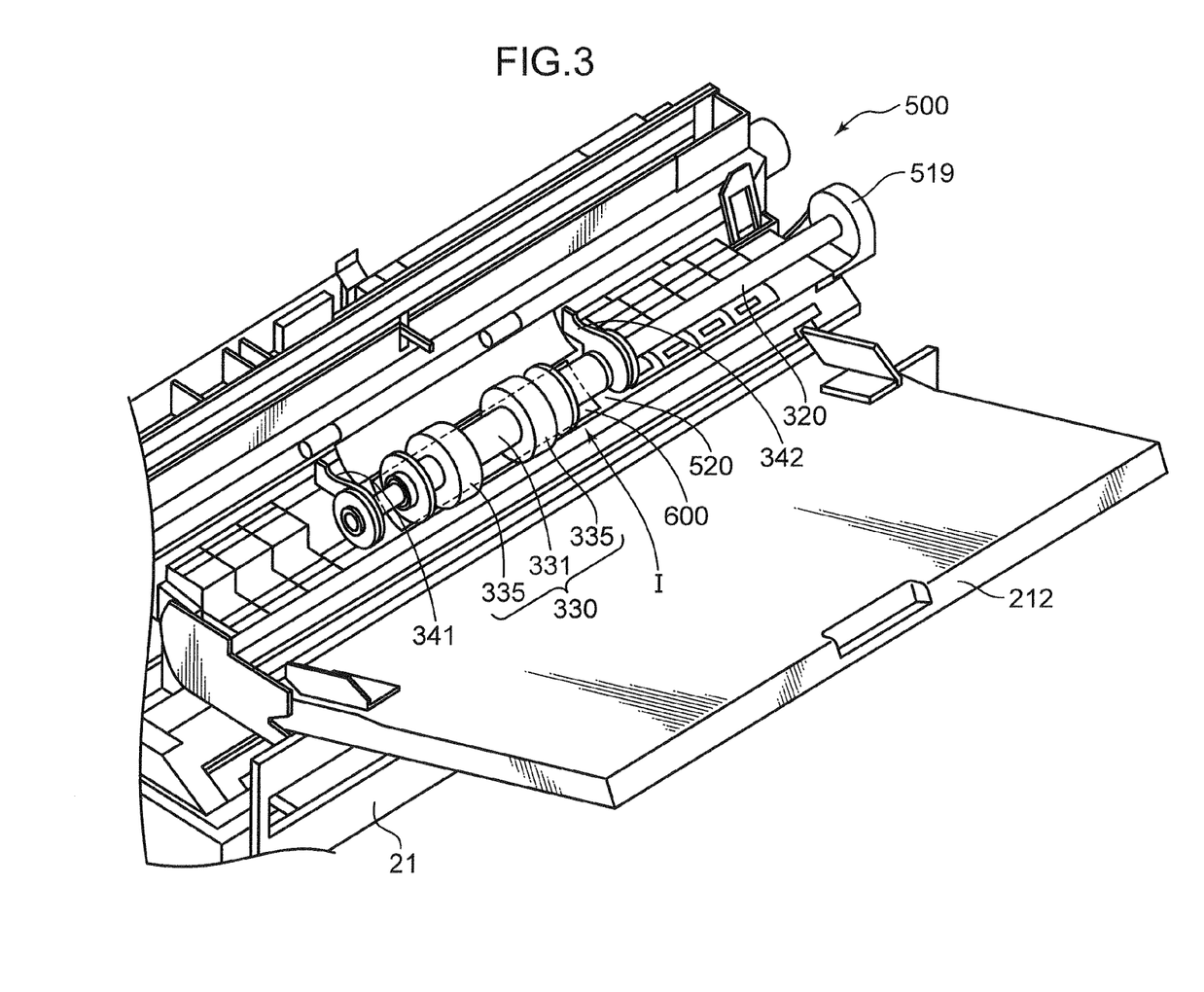
FIG. 3 is a perspective view of a sheet feeding mechanism incorporated in the image forming apparatus shown in FIG. 1.

FIG. 3 is a schematic perspective view of the sheet feeding mechanism 500 exposed by rotating the tray 212 downward. The sheet feeding mechanism 500 is arranged in an area between the lower housing 21 and a base end edge of the tray 212 acting as an axis of rotation.

Figure 7:
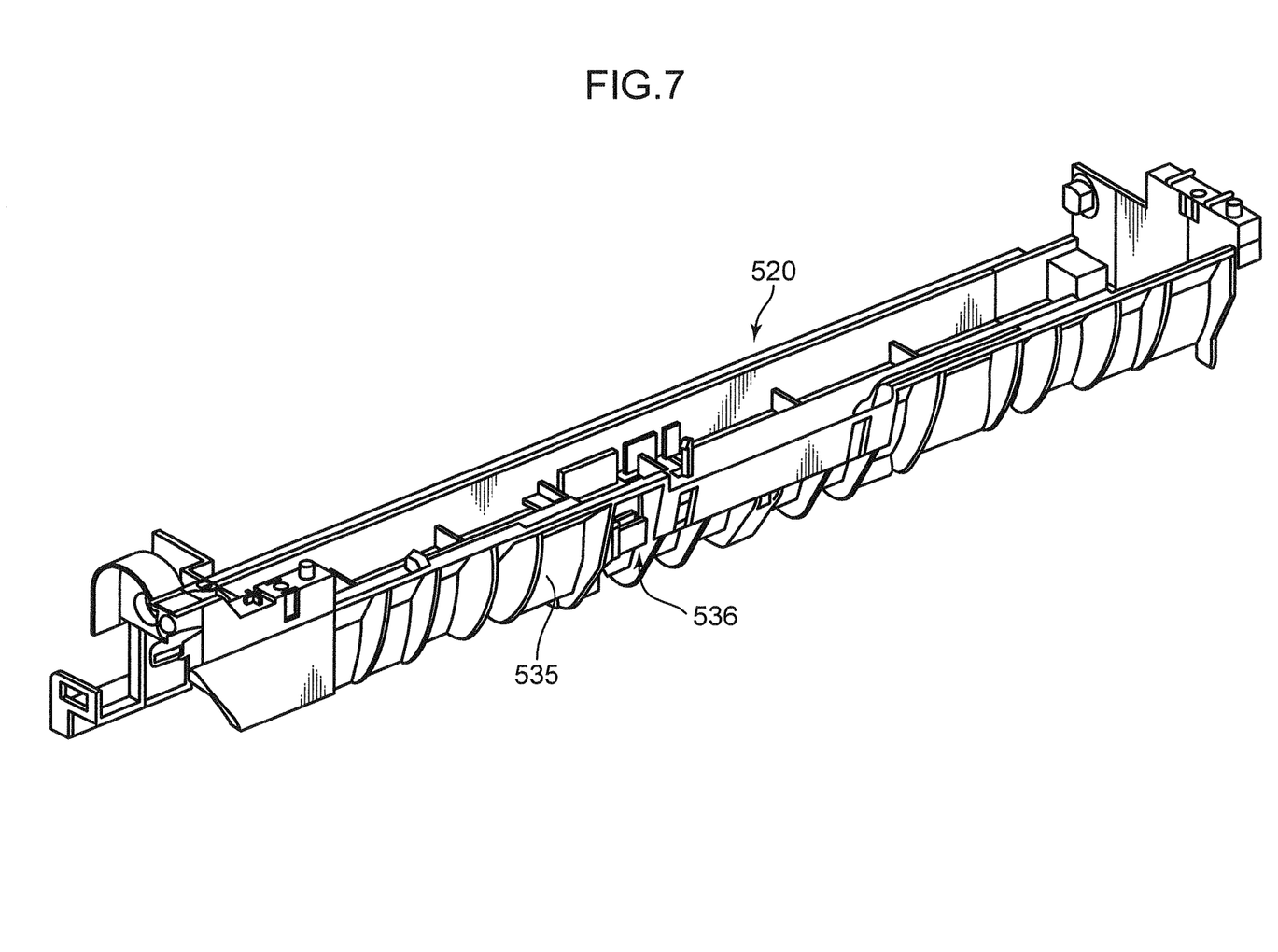
FIG. 7 is a perspective view showing a state where a photointerrupter (hereinafter, referred to as a PI sensor) is mounted on the back surface of the base portion shown in FIG. 4.
Figure 8:
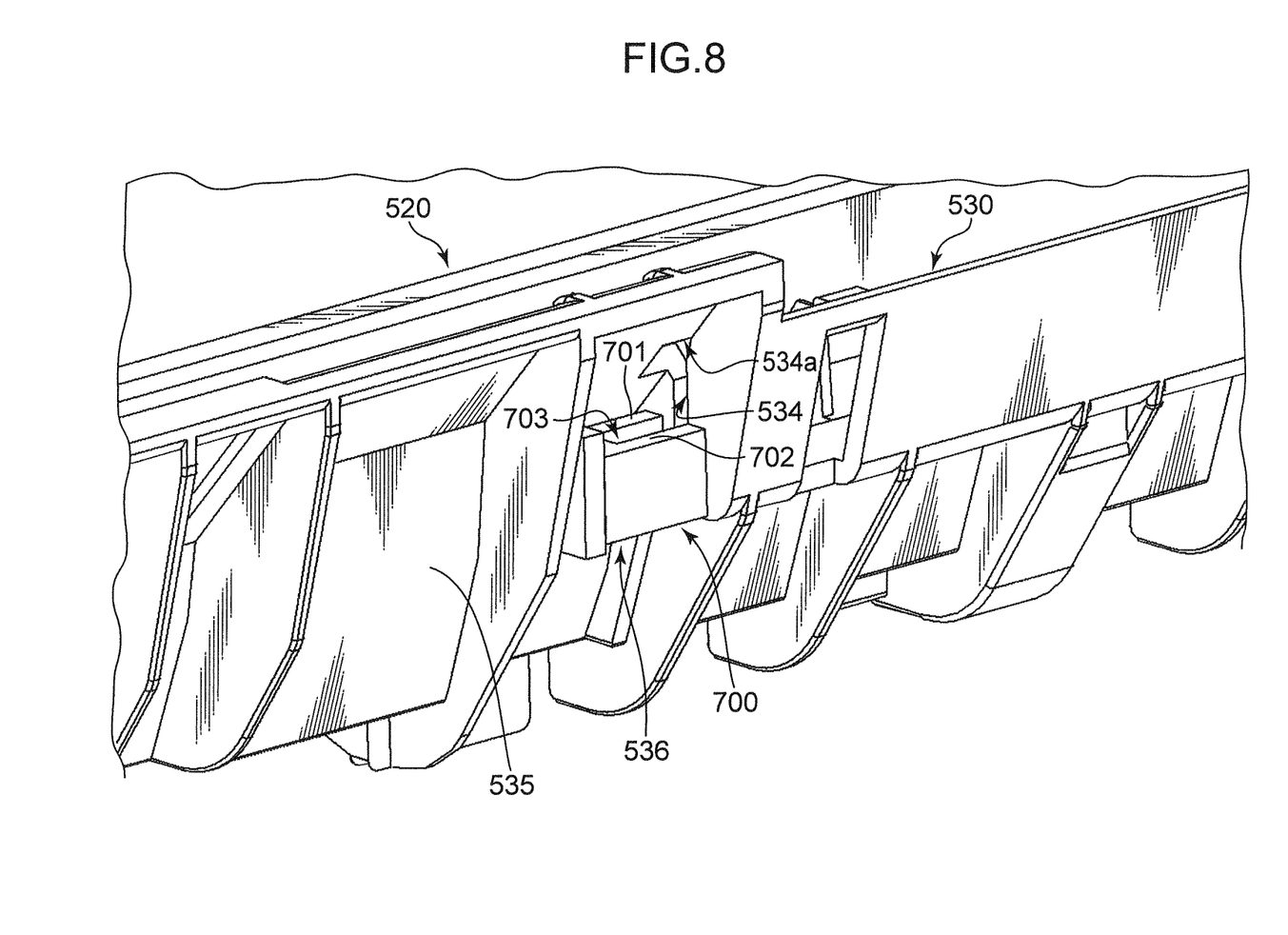
FIG. 8 is a partial enlarged perspective view of the PI sensor of FIG. 7 and its periphery.

The sheet feeding mechanism 500 of this embodiment includes a base portion 520, a feed roller assembly 330 (sheet feeding member) with feed rollers 335, a separation pad (separating member) 600, springs (biasing member) 630 (see FIG. 11), ribs (detectable portion) 621 (see FIGS. 10 and 11), a photointerrupter (hereinafter, referred to as a PI sensor) (detector) 700 (see FIGS. 7 to 9).

Figure 5:
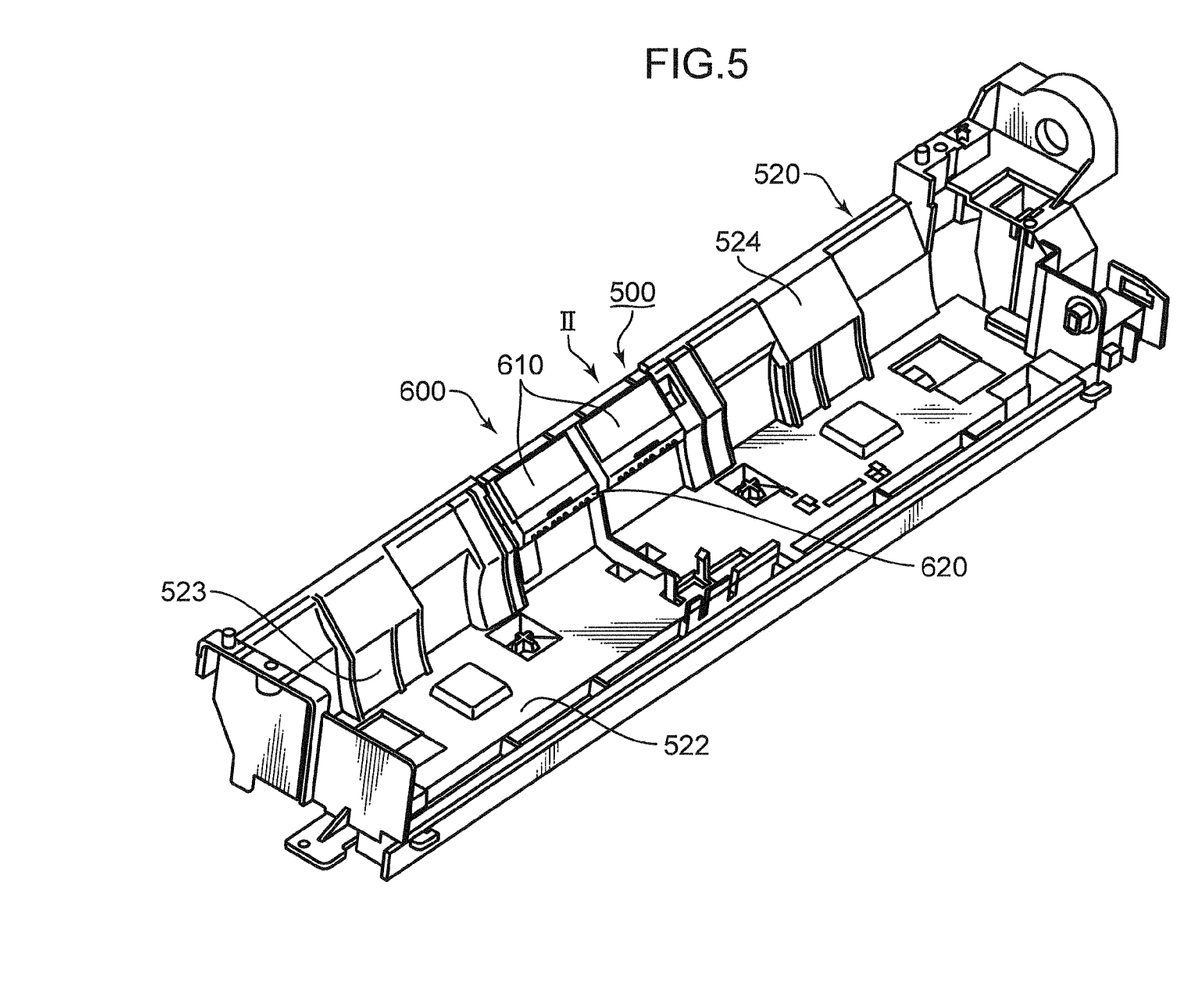
FIG. 5 is a perspective view showing a state where a separation pad is mounted on a base portion shown in FIG. 4.
Figure 6:
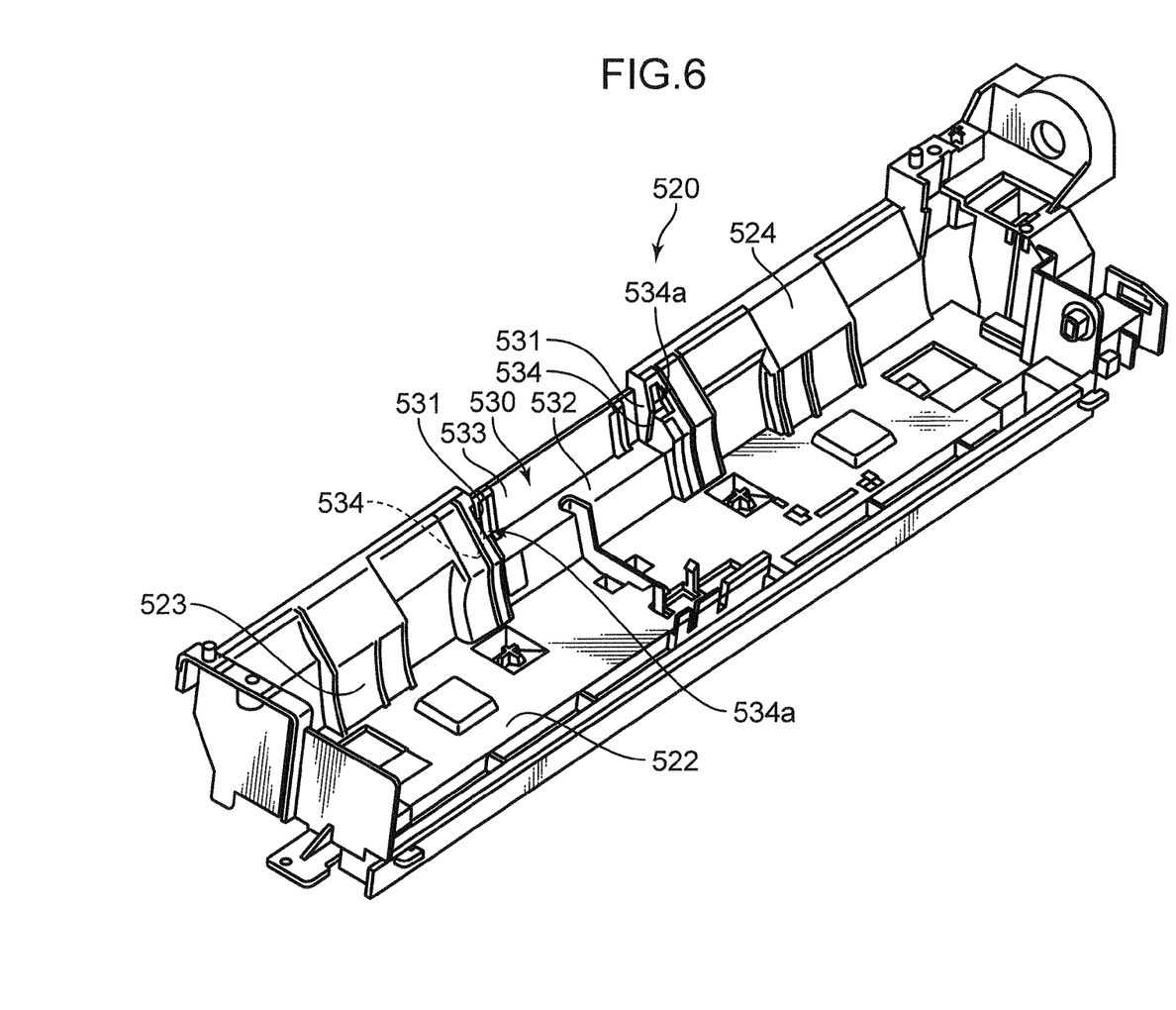
FIG. 6 is a perspective view showing the base portion shown in FIG. 4.

As shown in FIGS. 5 and 6, the base portion 520 is a frame body which is made of synthetic resin and on which the feed roller assembly 330 and the separation pad 600 are to be mounted. The base portion 520 includes a bottom wall 522 and an upright wall 523 standing from the bottom wall 522. The upright wall 523 is formed with guiding surfaces 524 for guiding a sheet toward the image forming unit 93. The upright wall 523 is recessed to form an accommodating portion 530 for accommodating the separation pad 600. The accommodating portion 530 is formed by being enclosed by a pair of positioning walls 531 extending in a vertical direction, a bottom wall 532 extending along the lower edges of the pair of positioning walls 531 and a downstream wall 533 along downstream edge parts of the pair of positioning walls 531 and the bottom wall 532. Each of the pair of positioning walls 531 is formed with a slit 534 which extends in the vertical direction and which can be engaged with the rib 621 of the separation pad 600 to be described later. The slits 534 shown in FIG. 6 penetrate through the positioning walls 531. Upper end openings 534a of the slits 534 are open at the upper side of the upright wall 523, so that the ribs 621 can be inserted into and withdrawn from the slits 534 from and to an upper side.

As shown in FIG. 3, the feed roller assembly 330 includes a roller shaft 331 aligned along the central axis of rotation of a drive shaft 320 and a pair of substantially cylindrical feed rollers 335 projecting from the outer circumferential surface of the roller shaft 331.

The feed roller assembly 330 and the drive shaft 320 are rotatably supported by a first supporting portion 341 and a second supporting portion 342 mounted on the lower housing 21.

The pair of feed rollers 335 come into contact with the leading edge of a sheet placed on the tray 212. The drive shaft 320 receives a drive force from a drive source via a gear (not shown) in a gear cover 519, whereby the feed rollers 335 can rotate to feed the sheet into the lower housing 21.

The feed rollers 335 are preferably made of a material (e.g. rubber) which generates a frictional force sufficient to convey a sheet on a surface of the sheet.

Figure 4:
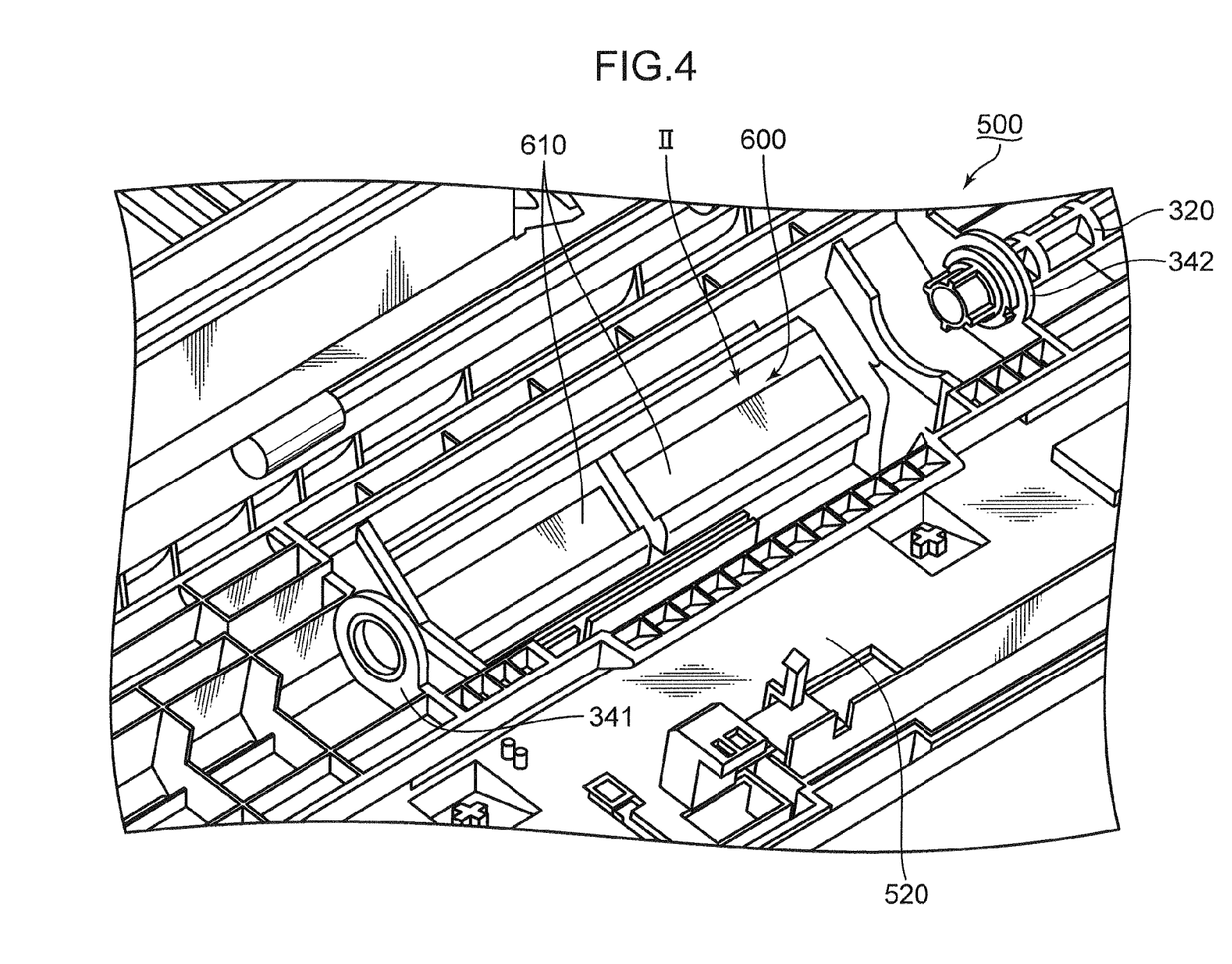
FIG. 4 is a perspective view showing a state where a feed roller assembly is removed from the sheet feeding mechanism shown in FIG. 3.

As shown in FIGS. 3 to 5, the separation pad 600 is a member for separating a sheet being conveyed by the feed rollers 335 from the sheet stack and accommodated in the accommodating portion 530 of the base portion 520. The separation pad 600 is composed of pad bodies 610 and a seat portion 620.

Further, as shown in FIGS. 10 to 13, the ribs 621 project from both side surfaces of the seat portion 620 of the separation pad 600 of this embodiment. The ribs 621 extend in a moving direction of the separation pad 600 between a first position I and a second position II. The ribs 621 are inserted into the slits 534 formed in the base portion 520 and guide the separation pad 600 accommodated in the accommodating portion 530 of the base portion 520 movably between the first position I and the second position II. The separation pad 600 is positioned to the first position I when being pressed by the feed rollers 335. The second position II is distanced upward from the first position I.

In this embodiment, the rib 621 is used as a detectable portion to be detected by the PI sensor 700. When the separation pad 600 is positioned at the first position I, the rib 621 is present at a detection position and detected by the PI sensor 700. On the other hand, when the separation pad 600 moves to the second position II or the separation pad 600 is not present, the rib 621 deviates from the detection position and, hence, is not detected by the PI sensor 700.

Figure 11:
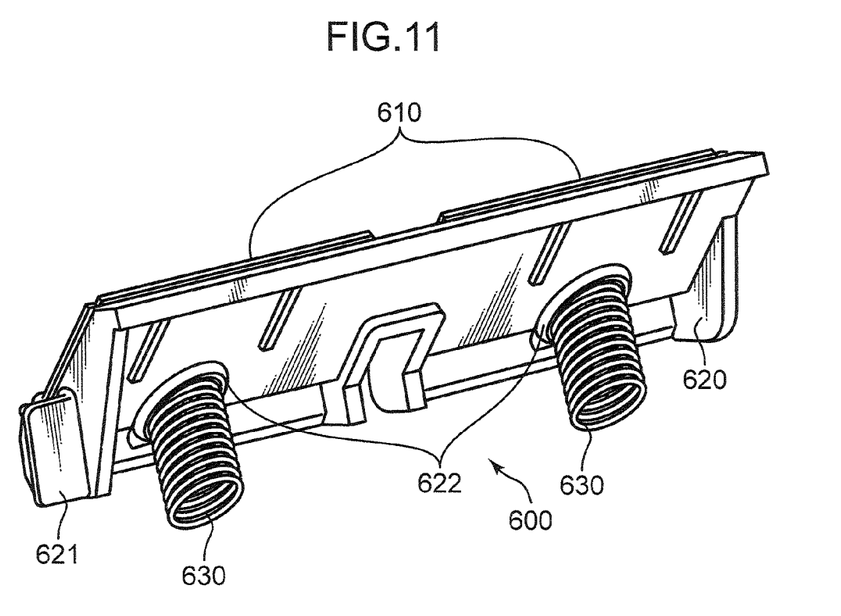
FIG. 11 is a perspective view of the separation pad shown in FIG. 4 when obliquely viewed from behind.

Further, as shown in FIG. 11, spring receiving portions 622 which are ring-shaped projections are provided at two positions on the back surface of the seat portion 620.

As shown in FIG. 11, two springs 630 are provided on the back surface of the seat portion 620 of the separation pad 600. Note that the number, shape and the like of the springs 630 are not particularly limited in the present disclosure. Upper end parts of the springs 630 are held by the spring receiving portions 622 of the seat portion 620 and lower end parts thereof are in contact with the bottom wall 532 (see FIG. 6) of the base portion 520. The springs 630 are compressed between the separation pad 600 and the base portion 520. The springs 630 bias the separation pad 600 in a direction from the first position I toward the second position II.

The pad bodies 610 are formed to be able to be accommodated in the seat portion 620. At the first position I, the upper surfaces of the pad bodies 610 form substantially one flat surface together with the guiding surfaces 524 and sandwich a sheet present between the guiding surfaces 524 and the feed rollers 335 together with the feed rollers 335. When the feed rollers 335 are about to feed a plurality of sheets, the pad bodies 610 apply a frictional force to the plurality of sheets to prevent the sheets other than the uppermost one out of the plurality of sheets from being conveyed to a downstream side.

Figure 9:
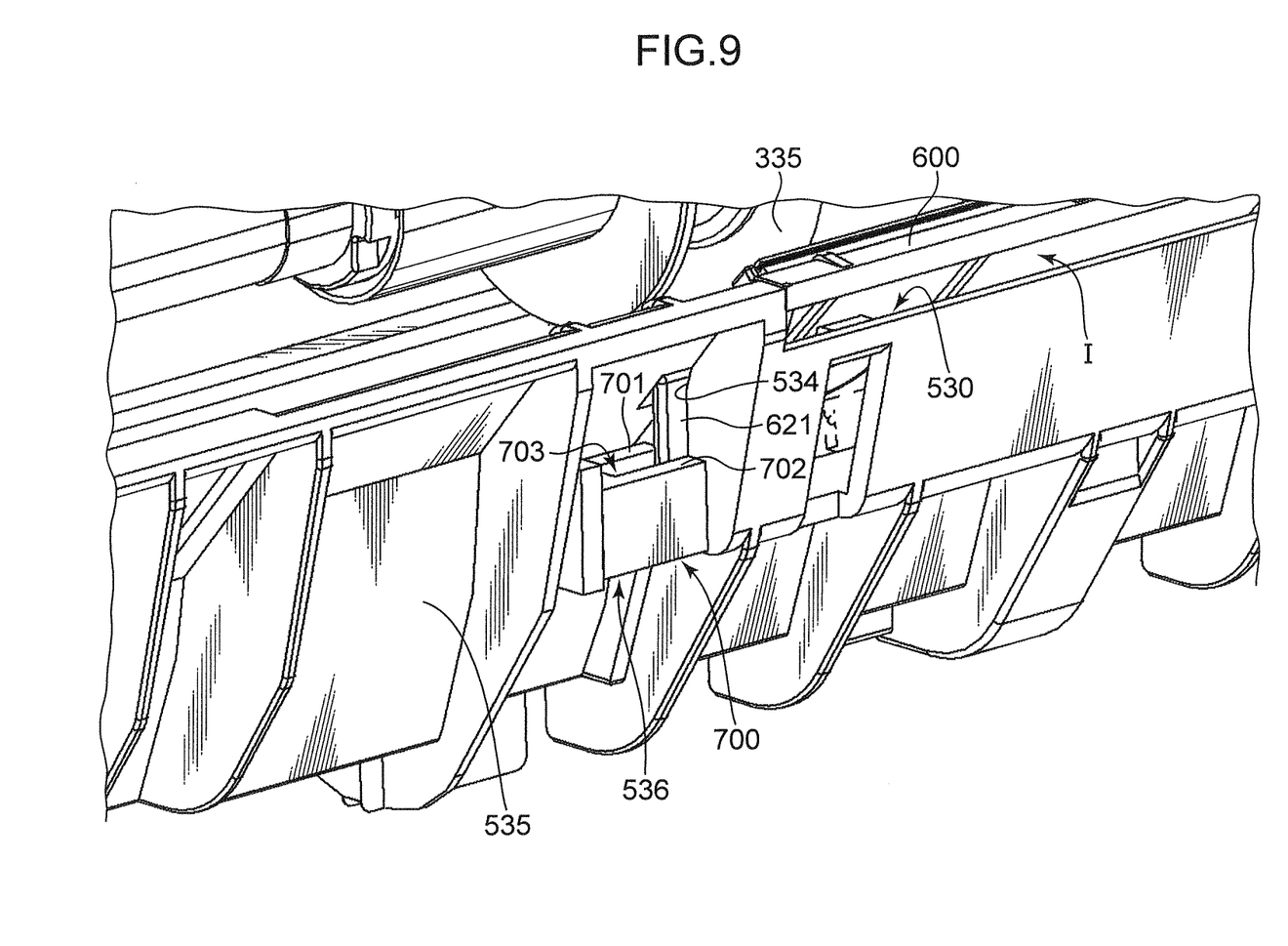
FIG. 9 is a partial enlarged perspective view showing a state where a rib of the separation pad is inserted in a slit of the PI sensor in the PI sensor of FIG. 8 and its periphery.
Figure 10:
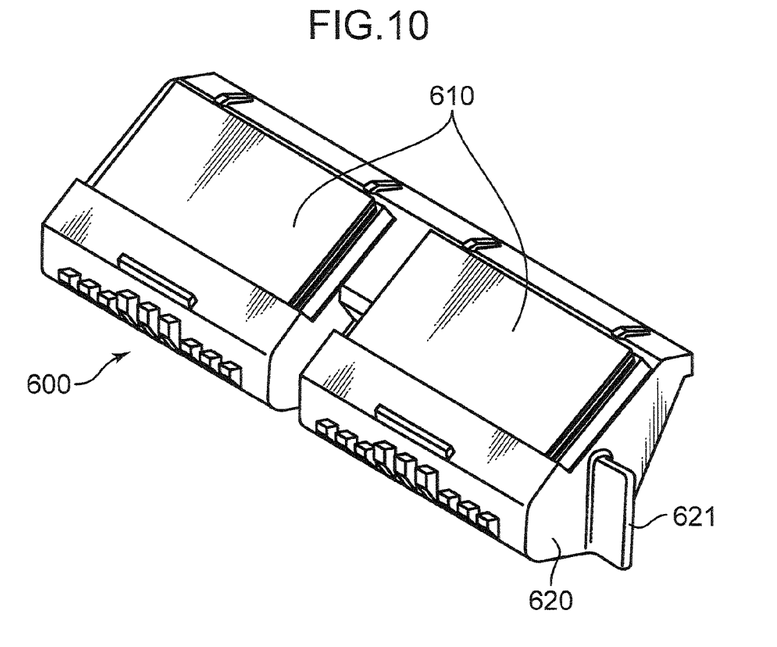
FIG. 10 is a perspective view of the separation pad shown in FIG. 4 when obliquely viewed from front.

As shown in FIGS. 8, 9, 12 and 13, the PI sensor 700 includes a light emitter 701 and a light receiver 702 for receiving light L generated in the light emitter 701. The light emitter 701 and the light receiver 702 are arranged to face each other across a clearance 703. A position where the light L proceeding from the light emitter 701 toward the light receiver 702 is blocked is a detection position. The PI sensor 700 is accommodated in the accommodating portion 536 (see FIGS. 7 to 9) provided in a back surface 535 of the base portion 520. The clearance 703 of the PI sensor 700 accommodated in the accommodating portion 536 communicates with the slit 534 of the base portion 520. Thus, as shown in FIG. 9, the rib 621 projecting backward from the base portion 520 through the slit 534 is inserted into the clearance 703 and arranged vertically movably along the slit 534.

Figure 12:
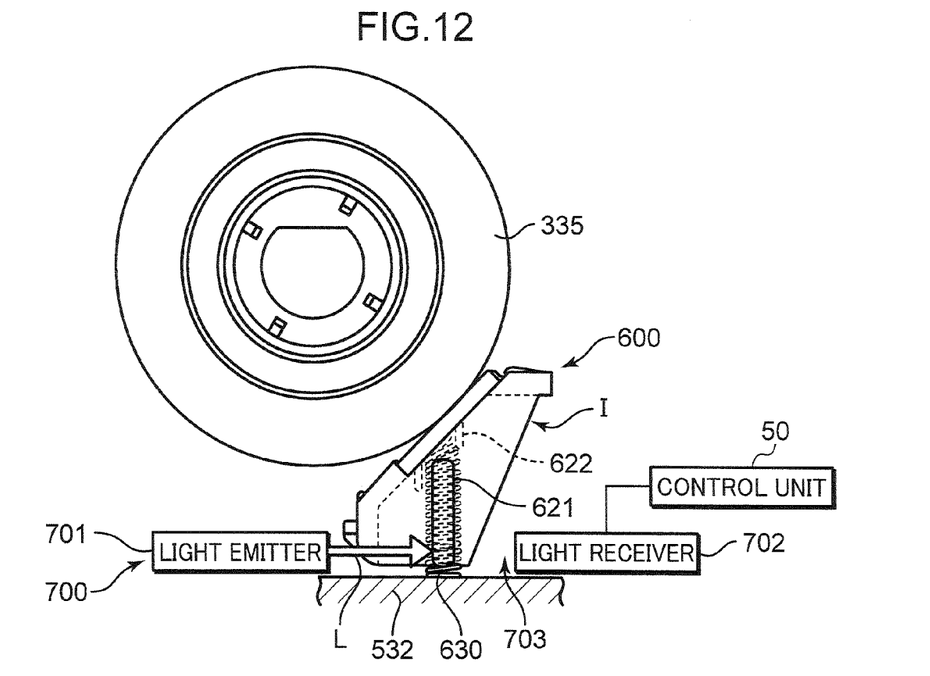
FIG. 12 is a diagram showing a state where the separation pad shown in FIG. 4 is positioned at a first position by being pressed by feed rollers and the rib blocks light proceeding from a light emitter to a light receiver of the PI sensor.
Figure 13:
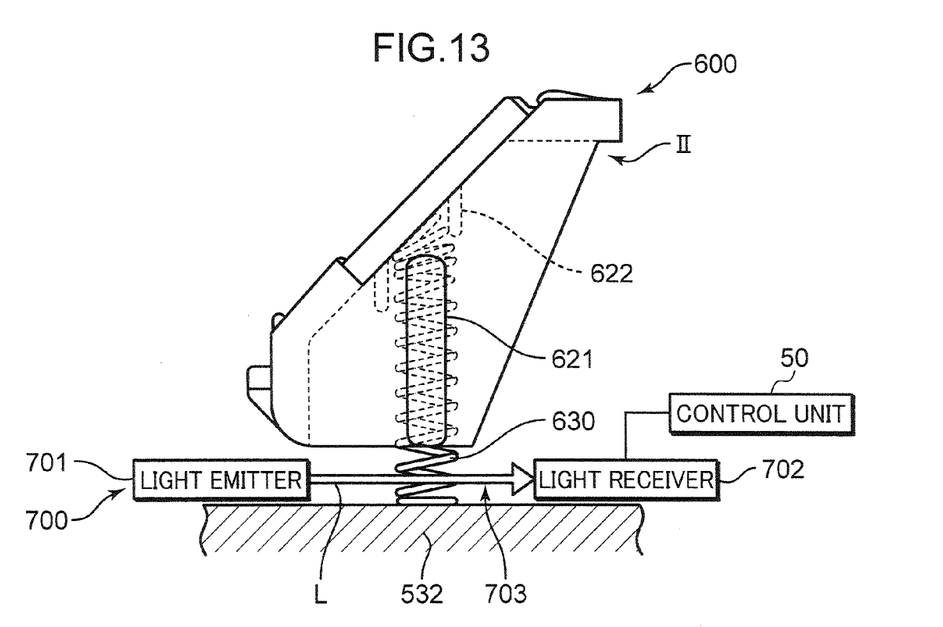
FIG. 13 is a diagram showing a state where the separation pad shown in FIG. 4 is located at a second position without being pressed by the feed rollers and the rib does not block light proceeding from the light emitter to the light receiver of the PI sensor.

When the separation pad 600 is positioned to the first position I by being pressed from above by the feed rollers 335 as shown in FIG. 12, the rib 621 blocks light L proceeding from the light emitter 701 toward the light receiver 702. Thereby, the PI sensor 700 can detect the rib 621 since the rib 621 is located at the detection position when the separation pad 600 is positioned at the first position I. In this way, a control unit 50 (see FIGS. 2, 12 and 13) of the image forming apparatus 1 having received a signal with regard to the detection of the rib 621 (detection signal) from the PI sensor 700 can discriminate the presence of the feed rollers 335 and the separation pad 600. On the other hand, when the separation pad 600 is not positioned at the first position I (i.e. when at least either the feed rollers 335 or the separation pad 600 is absent as shown in FIG. 13 as described later), the rib 621 is not at the detection position. Thus, light L emitted from the light emitter 701 can be received by the light receiver 702. In this way, the control unit 50 of the image forming apparatus 1 having received a signal on the non-detection of the rib 621 (non-detection signal) from the PI sensor 700 can discriminate the absence of at least either the feed rollers 335 or the separation pad 600.

In the sheet feeding mechanism 500 of this embodiment, a sheet feeding operation is performed in the following procedure as shown in a flow chart of FIG. 14.

Figure 14:
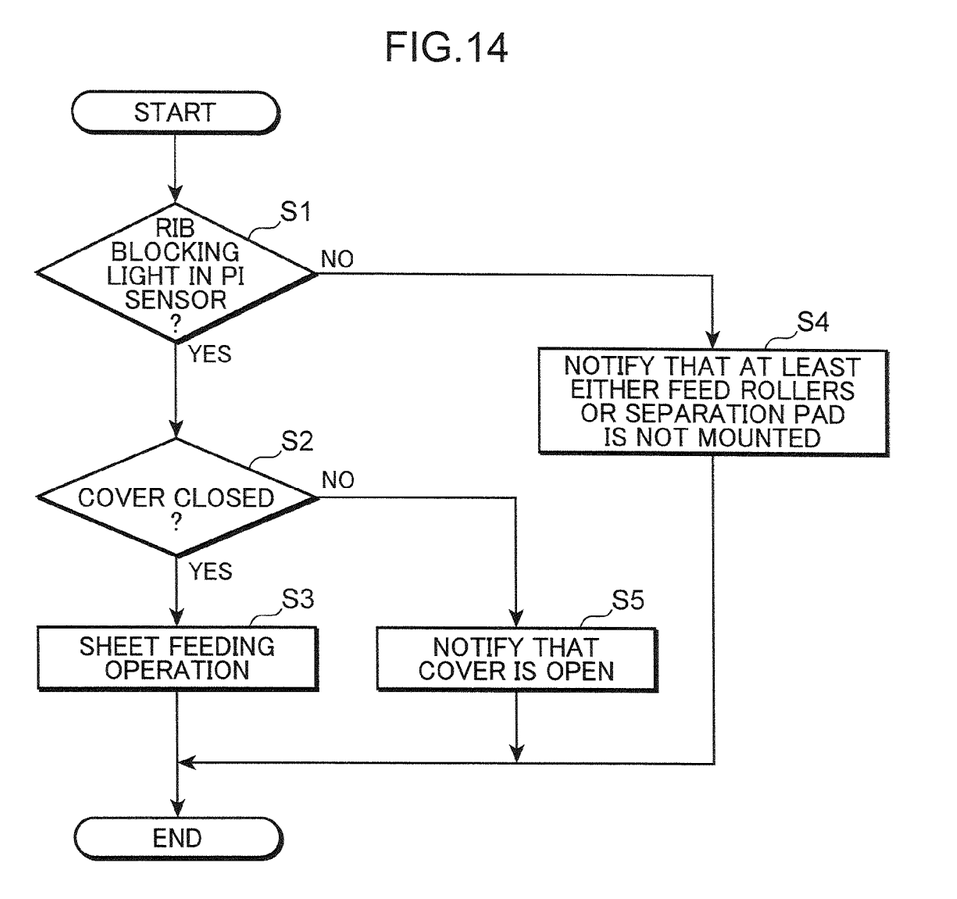
FIG. 14 is a flow chart showing the procedure of a sheet feeding operation of the sheet feeding mechanism shown in FIG. 1.

First, before causing the sheet feeding mechanism 500 to start the sheet feeding operation, the control unit 50 of the image forming apparatus 1 discriminate whether or not light of the PI sensor 700 is blocked by the rib 621, i.e. light L proceeding from the light emitter 701 to the light receiver 702 is blocked by the rib 621 in Step S1 of FIG. 14.

When the rib 621 blocks light, the separation pad 600 is specifically at the first position I as shown in FIG. 12. That is, when the feed rollers 335 and the separation pad 600 are mounted at predetermined positions on the base portion 520, the separation pad 600 is pressed by the feed rollers 335 against biasing forces by the springs 630 to be positioned to the first position I. At this time, the rib 621 provided on the separation pad 600 blocks the light L between the light emitter 701 and the light receiver 702. In this way, the PI sensor 700 detects the rib 621, whereby the control unit 50 having received a detection signal from the PI sensor 700 can discriminate the presence of both the feed rollers 335 and the separation pad 600.

If the PI sensor 700 discriminates that the light is blocked in Step S1, this routine proceeds to Step S2 in which whether or not a cover (not shown) for protecting the sheet feeding mechanism 500 is closed is discriminated by a cover detection sensor (not shown) or the like.

If the cover is discriminated to be closed in Step S2, the sheet feeding operation by the sheet feeding mechanism 500 is performed in Step S3.

On the other hand, if the PI sensor 700 does not discriminate that the light is blocked in Step S1, this routine proceeds to Step S4 and ends without performing the sheet feeding operation after it is notified that at least either the feed rollers 335 or the separation pad 600 is not mounted.

Here, a case where the PI sensor 700 does not discriminate that the light is blocked in Step S1 is specifically described. First, in a first pattern, i.e. when the feed rollers 335 are not mounted on the base portion 520 as shown in FIG. 13, the separation pad 600 is moved to the second position II by the biasing forces of the springs 630 and the rib 621 is also move upward in the clearance 703 of the PI sensor 700. At this time, light L emitted from the light emitter 701 of the PI sensor 700 reaches the light receiver 702 via the clearance 703 without being blocked by the rib 621. That is, the PI sensor 700 is in a state where the light is not blocked by the rib 621.

Further, also in a second pattern, i.e. when the separation pad 600 is not mounted on the base portion 520 and not present, the PI sensor 700 is in the state where the light is not blocked by the rib 621. In either of these first and second patterns, the PI sensor 700 does not detect the rib 621. In this way, the control unit 50 having received a non-detection signal from the PI sensor 700 can discriminate that at least either the feed rollers 335 or the separation pad 600 is not present.

In the above Step S4, the PI sensor 700 specifically sends a non-detection signal to the control unit 50 of the image forming apparatus 1 to notify that at least either the feed rollers 335 or the separation pad 600 is not mounted. The control unit 50 notifies to the user by displaying a message, a symbol or the like to the effect that at least either the feed rollers 335 or the separation pad 600 is not mounted on the LCD touch panel 222. Notification may be made to the user by emitting a warning sound by means of an unillustrated buzzer or turning on a warning lamp.

Further, if the cover is not discriminated to be closed in the above Step S2, this routine proceeds to Step S5 and ends without performing the sheet feeding operation after it is notified by means of the LCD touch panel 222 or the buzzer that the cover is open.

As described above, in the sheet feeding mechanism 500 of this embodiment, the separation pad 600 is pressed by the feed rollers 335 against the biasing forces of the springs 630 to be positioned to the first position I when the feed rollers 335 and the separation pad 600 are mounted at the predetermined positions on the base portion 520. At this time, since the rib 621 provided on the separation pad 600 is at the detection position, the PI sensor 700 can detect the rib 621. In this way, the control unit 50 having received a detection signal from the PI sensor 700 can discriminate the presence of both the feed rollers 335 and the separation pad 600.

On the other hand, if the feed rollers 335 are not mounted on the base portion 520, the separation pad 600 is positioned to the second position II by the biasing forces of the springs 630. At this time, the PI sensor 700 cannot detect the rib 621 since the rib 621 deviates from the detection position. Further, also when the separation pad 600 is not mounted on the base portion 520, the PI sensor 700 cannot detect the rib 621. Since the PI sensor 700 does not detect the rib 621 in either of these cases, the control unit 50 having received a non-detection signal with regard to the non-detection of the rib 621 from the PI sensor 700 can discriminate the absence of at least either the feed rollers 335 or the separation pad 600. In this way, the presence or absence of the feed rollers 335 and the separation pad 600 can be accurately discriminated using one PI sensor 700. Further, since the presence or absence of a plurality of parts can be monitored using one PI sensor 700, it is possible to suppress production cost and an installation space for the PI sensor 700.

Further, in the sheet feeding mechanism 500 of this embodiment, it can be reliably notified to the user that the feed rollers 335 and the separation pad 600 are not mounted on the base portion 520 by the detection of the rib 621 by the PI sensor 700. Thus, an operation failure caused by the forgetting of the mounting of the feed rollers 335 and the separation pad 600 can be reliably prevented.

Furthermore, by the configuration as described above, it is also possible to detect the breakage of the seat portion 620 of the separation pad 600 and prevent erroneous insertion of the separation pad 600 by the user. Thus, not only the presence or absence of the feed rollers 335 and the separation pad 600, but also the breakage of the separation pad 600 and the like can be detected by one PI sensor 700.

Further, in the sheet feeding mechanism 500 of this embodiment, the rib 621 that guides the separation pad 600 movably between the first position I and the second position II is used as the detectable portion to be detected by the PI sensor 700. Thereby, the control unit 50 can discriminate the presence of the feed rollers 335 and the separation pad 600 by the detection of the rib 621 by the PI sensor 700. Further, the control unit 50 can discriminate the absence of at least either the feed rollers 335 or the separation pad 600 by the non-detection of the rib 621 by the PI sensor 700. Thus, detection can be accurately made by a simple structure. In addition, it is not necessary to provide a tongue piece or the like to be detected by the PI sensor 700 in addition to the rib 621 by using the rib 621 for guiding the separation pad 600 as the detectable portion, wherefore it is possible to suppress an increase in the number of parts.

Further, in the sheet feeding mechanism 500 of this embodiment, the PI sensor 700 including the light emitter 701 and the light receiver 702 is used as the detector and can detect the rib 621 blocking light L between the light emitter 701 and the light receiver 702. Thus, detection can be accurately made by a simple structure. In addition, since the rib 621 is used as the detectable portion, it is possible to suppress an increase in the number of parts. Further, since the PI sensor 700 can detect the rib 621 in a noncontact manner, there is no possibility of a failure resulting from contact with the rib 621.

Further, since the image forming apparatus 1 of this embodiment includes the above sheet feeding mechanism 500 and the image forming unit 93 for forming an image on a sheet conveyed by the sheet feeding mechanism 500, the presence or absence of the feed rollers 335 and the separation pad 600 can be discriminated using one PI sensor 700 and the present or absence of a plurality of parts can be monitored using one PI sensor 700. Thus, it is possible to suppress production cost and the installation space for the PI sensor 700.

Although the detector has been described in the above embodiment, taking the PI sensor 700 as an example, the present disclosure is not limited to this. Any detector can be adopted if it can detect the detectable portion provided on the separation pad 600 when the separation pad 600 is positioned to the first position I.

Although the separation pad 600 has been described as an example of the separating member in the above embodiment, the present disclosure is not limited to this. Any separating member may be adopted if it can separate a sheet being conveyed by the feed rollers 335 from the sheet stack and is mounted on the base portion 520 to be movable between the first position I to which the separating member is positioned when being pressed by the feed rollers 335 and the second position II at a distance from the first position I. For example, a separation roller movable in the vertical direction may be adopted as the separating member. Also in such a case, the presence or absence of both the feed rollers and the separating member can be discriminated using one detector if a shaft or the like of the separation roller is detected as the detectable portion by the detector such as the PI sensor.

Note that although the rib 621 is provided on each of the both side surfaces of the seat portion 620 of the separation pad 600 in the above embodiment, it may be provided only on one side surface of the seat portion 620. Also in such a case, the rib can be detected by the detector such as the PI sensor.

Note that although the feed roller assembly 330 has been described as an example of the sheet feeding member for conveying a sheet in the above embodiment, the present disclosure is not limited to this. Any member can be adopted as the sheet feeding member of the present disclosure if it can convey a sheet. For example, a belt or the like can be adopted as the sheet feeding member.

Further, although the image forming apparatus 1 including the above sheet feeding mechanism 500 is illustrated in the above embodiment, the present disclosure may be applied to an image reading apparatus including the above sheet feeding mechanism 500. Such an image reading apparatus includes the above sheet feeding mechanism 500 and an image reading unit for reading an image formed on a sheet conveyed by the sheet feeding mechanism 500. By this configuration, similarly to the above image forming apparatus 1, the presence or absence of the feed rollers 335 and the separation pad 600 can be discriminated using one PI sensor 700 and the presence or absence of a plurality of parts can be monitored using one PI sensor 700. Therefore, it is possible to suppress production cost and the installation space for the PI sensor 700.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A sheet feeding mechanism, comprising:
   a base portion;
   a sheet feeding member which is rotatably supported on the base portion and conveys a sheet;
   a separating member which is a member for separating a sheet being conveyed by the sheet feeding member from a sheet stack and mounted on the base portion to be movable between a first position to which the separating member is positioned when being pressed by the sheet feeding member and a second position at a distance from the first position;
   a biasing member which biases the separating member so that the separating member moves from the first position toward the second position;
   a detectable portion which is provided on the separating member; and
   a detector which detects the detectable portion at a detection position;
   wherein the detectable portion is present at the detection position when the separating member is positioned at the first position and deviates from the detection position when the separating member is moved to the second position;
   the detectable portion is a rib extending along a moving direction of the separating member between the first position and the second position;
   the rib is inserted into a groove formed in the base portion and guides the separating member movably between the first position and the second position; and
   the rib is detected by the detector when the separating member is at the first position.

2. A sheet feeding mechanism according to claim 1, wherein:
   the detector is a photointerrupter including a light emitter and a light receiver for receiving light generated in the light emitter; and
   the rib blocks light proceeding from the light emitter toward the light receiver when the separating member is positioned at the first position.

3. An image forming apparatus, comprising:
   the sheet feeding mechanism according to claim 1; and
   an image forming unit for forming an image on the sheet conveyed by the sheet feeding mechanism.

4. An image reading apparatus, comprising:
   the sheet feeding mechanism according to claim 1; and
   an image reading unit for reading an image formed on the sheet conveyed by the sheet feeding mechanism.

* * * * *